United States Patent

[11] 3,608,851

[72] Inventor Richard D. Anderson
866 S. Charles Street, Elgin, Ill. 60120
[21] Appl. No. 784,624
[22] Filed Dec. 18, 1968
[45] Patented Sept. 28, 1971

[54] SHOCK ABSORBER MOUNTING ASSEMBLY
6 Claims, 4 Drawing Figs.
[52] U.S. Cl. .................................................. 248/15, 280/96.2
[51] Int. Cl. .................................................. F16f 15/00
[50] Field of Search ................................... 248/15, 23, 3; 267/177, 20, 64; 280/91.2, 124.1, 96.2; 188/88

[56] References Cited
UNITED STATES PATENTS
2,611,625 9/1952 Kishline et al. ............... 267/20 X
3,443,530 5/1969 Carlson ......................... 248/188 X FOREIGN PATENTS
805,287 12/1958 Great Britain ............... 267/20
150,670 11/1960 U.S.S.R. ....................... 267/177

Primary Examiner—J. Franklin Foss
Attorney—Molinare, Allegretti, Newith and Witcoff ABSTRACT: A shock absorber mounting assembly in which the shock absorber is provided with an axially extending stud at each end for mounting the shock absorber between the structures which are to be shock insulated from each other and an offset bracket is fitted on one of the studs and mounts the stud to one of the structures.

PATENTED SEP 28 1971 3,608,851
FIG. 1
PRIOR ART
FIG. 2
FIG. 3
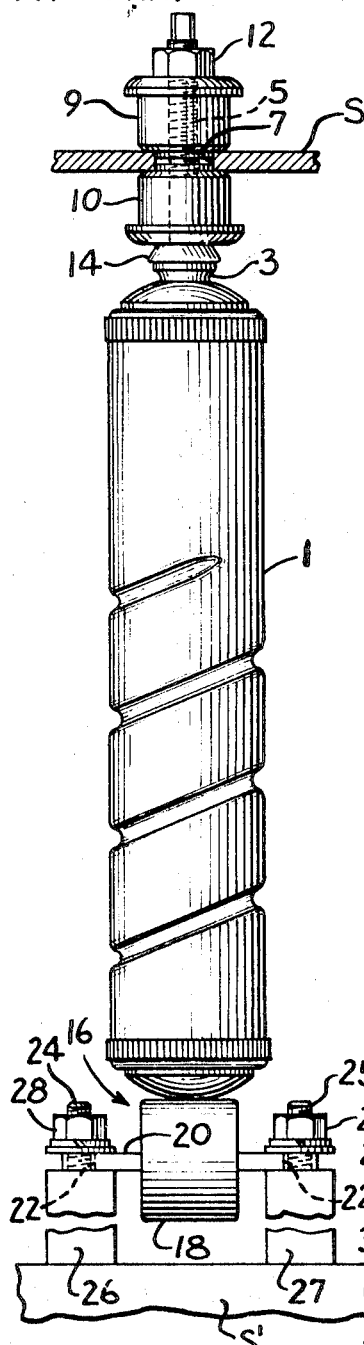
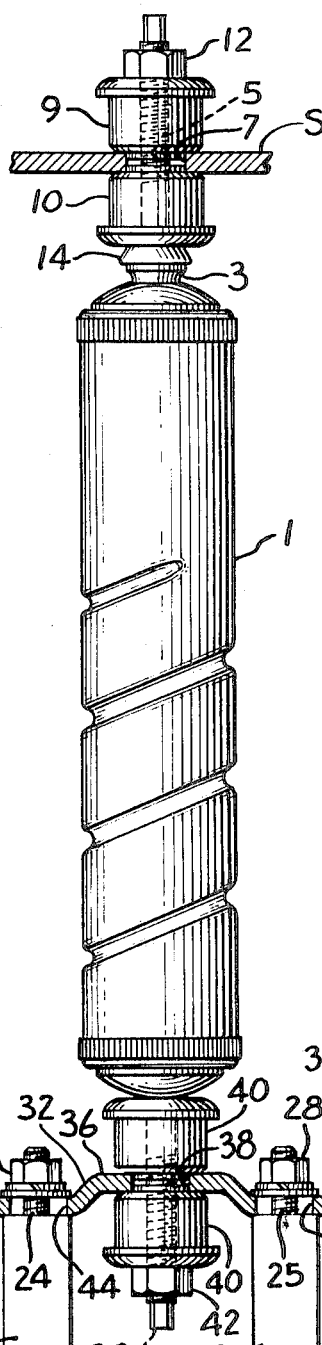
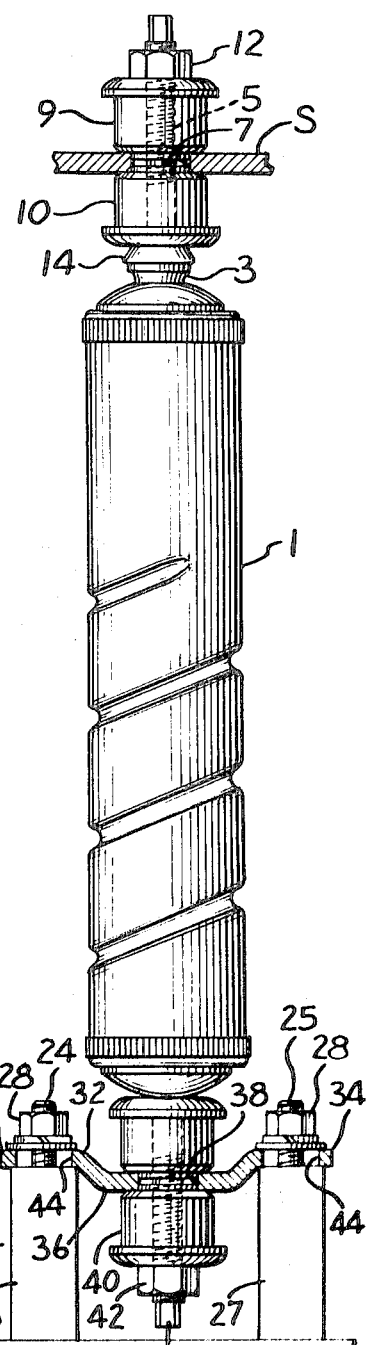
FIG. 4
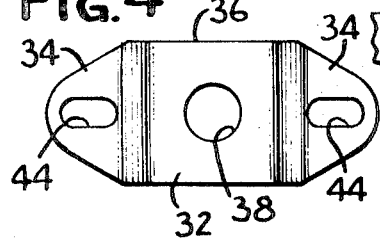
INVENTOR
RICHARD D. ANDERSON
by: Bair, Freeman & Molinare
ATTYS.

SHOCK ABSORBER MOUNTING ASSEMBLY

BACKGROUND OF THE INVENTION

This invention relates to a shock absorber mounting assembly and, more particularly, to a mounting assembly in which the shock absorber is mounted by an offset bracket.

In the past, shock absorbers have generally been provided in a variety of forms differing in length as well as mounting construction from each other. Such differing construction has been necessitated by the variety of spacing distances encountered in practice between the structures to be shock insulated from each other, as well as the variety of mounting constructions for which the structures are fitted.

For example, at least two types of shock absorber mountings have been utilized in the past, the bar-type mounting and stud-type mounting. In the stud-type mounting, a stud extending from an end of the shock absorber is generally mounted to one of the structures to be insulated. In the bar-type mounting, an end of the shock absorber carries a flat bar which extends generally perpendicular to the shock absorber axis, the bar being mounted to the structure at least at two points spaced from the axis. Where the structure is designed to receive a bar-type mounting, a shock absorber having the stud-type mounting generally is unusable and vice versa. Even where a given shock absorber carries the proper type of mounting, the shock absorber is frequently incapable of installation since it is not of the proper length to fit between the particular structures which are to be shock insulated from each other.

The shock absorber mounting assembly of my invention obviates these numerous disadvantages and renders possible the inventory and use of only a single given shock absorber of a given length and mounting construction for installation in varied installation conditions in which the structures to be shock insulated are spaced from each other at various distances, as well as where the mounting construction for which the structures have been adapted is of either the stud-type, bar-type or both. The shock absorber mounting assembly of my invention includes a shock absorber housing having a stud extending from each end and an offset bracket is provided to enable one of the studs to be mounted on a mounting which is adapted to receive a bar-type fitting, even where the bar-type mounting components are spaced at varying distances from each other, without necessitating the provision of a number of different individual shock absorbers. Also the bracket of my invention is reversible to enable installation of a given length shock absorber between structures of varied spacing. The shock absorber mounting assembly is extremely simple and inexpensive in both manufacture and use and effects a substantial reduction in the inventory of shock absorbers which must be stocked in order to meet varied installation conditions.

SUMMARY OF THE INVENTION

In a principal aspect, the shock absorber mounting assembly incorporating the principles of my invention includes an elongated shock absorber having an elongated stud extending from each end and mounting means is provided on each of the studs to mount the shock absorber between the structures which are to be shock insulated from each other. A bracket, having first and second portions which are located in different planes, is provided and at least one of the studs is received in an aperture defined in one of the portions, and fastening means attaches the other portion to one of the structures.

These and other objects, features and advantages of the present invention will be more clearly understood through a consideration of the following detailed description.

BRIEF DESCRIPTION OF THE DRAWING

In the course of this description reference will be frequently made to the attached drawing in which:

FIG. 1 is an overall view of a shock absorber mounting assembly of the prior art in which the shock absorber is of the type having a combination stud- and bar-type mounting assembly;

FIG. 2 is an overall partially cross-sectioned view of the mounting assembly incorporating the principles of my invention wherein the structures which are shock insulated from each other are spaced apart by a substantial distance;

FIG. 3 is an overall partially cross-sectioned view of the shock absorber mounting assembly incorporating the principles of my invention in which the structures which are insulated from each other are spaced apart by distance less than the distance between the structures of FIG. 2; and FIG. 4 is a plan view of a preferred embodiment of mounting bracket of my invention.

DESCRIPTION OF THE PREFERRED EMBODIMENT

Referring to FIG. 1, a typical prior conventional shock absorber and mounting assembly is shown which comprises a shock absorber housing 1 having the usual axially moveable piston member 3 located at one end thereof which is adapted to move in and out of the housing as shock is experienced by the shock absorber. The internal details of the shock absorber form no part of my invention and accordingly will not be described. Extending axially from the moveable piston 3 is a threaded stud 5 which is adapted to pass through an aperture 7 in one of the structures S to be shock insulated which may be, by way of example, the frame of an automobile. Suitable washers 9 and 10, formed of a resilient material such as rubber or the like, are carried by the stud 5 and a nut 12 is threaded on the stud to compress the washers together against the structure S and an enlarged shoulder 14 on the piston member 3, and thus mount one end of the shock absorber and its moveable piston to the structure S.

Carried at the other end of the typical prior shock absorber housing, is a conventional bar-type mounting assembly, generally 16, wherein a cylindrical knuckle 18 is attached to the end of the housing 1 such that its axis extends perpendicular to the housing axis. A bar 20 extends through the knuckle and is firmly embedded and held in position in the knuckle by a suitable resilient material (not shown) which fills the knuckle. Each end of the bar 20 is slotted at 22 to receive studs 24 and 25 which are each carried upon suitable pedestal members 26 and 27. The pedestal members are, in turn, rigidly attached to the other structure S' which is to be shock insulated from the structure S. The structure S' may be, by way of example, the axle of an automobile. Nuts 28 are threaded down upon the studs to maintain the bar 20 in fixed relationship to the pedestals 26 and 27, thus attaching the other end of the shock absorber to structure S'.

As previously mentioned, such prior shock absorber mounting construction suffers numerous disadvantages. One of the primary disadvantages is that such construction necessitates the stocking of a number of different shock absorbers in order to satisfy varying installation configurations. For example, if the installation in which the shock absorber is to be mounted is of the dual stud-type, i.e., where both structures S and S' are adapted to receive a stud-type mounting, the bar-type mounting is generally unusable and a separate shock absorber must be stocked having a stud at each end. Conversely, the latter mentioned shock absorber having a stud at each end is unusable where one of the structures is adapted to receive a bar-type mounting as shown in FIG. 1. Moreover, varying length shock absorbers must be also stocked in order to supply the installation needs for installations in which the structures S and S' are spaced at various distances from each other. Also where the bar-type pedestals 26 and 27 are spaced at differing distances from each, a number of shock absorbers having bars 20 of differing lengths must be frequently stocked in order to effectively bridge the gap between the mounting pedestals. All in all, a large inventory of different shock absorbers must frequently be stocked to meet the above-mentioned varied installation conditions.

Referring to FIGS. 2 and 3, the preferred embodiment of mounting assembly of my invention is shown which substantially overcomes these numerous difficulties and which substantially enables the installation of a single uniform shock absorber irrespective of the numerous variations previously mentioned. Since numerous individual components of the assembly of my invention are similar to the components previously described in FIG. 1, like reference numerals will be used to describe like components. In the shock absorber mounting assembly of my invention, the bar-type mounting 16 has been replaced by a second stud 30, similar in construction to stud 5, but extending axially from the opposite end of the housing 1. A generally U-shaped offset bracket 32, having a pair of flanged portions 34 and an offset intermediate portion 36, is provided. The stud 30 extends through an aperture 38 provided in the offset intermediate portion 36 of the bracket and is firmly mounted between resilient washers 40 by a nut 42 which is threaded to the end of the stud. The flanged portions 34, in turn, each include an elongated slot 44 through which the studs 24 and 25 extend. Nuts 28, threaded on the end of each of the studs 24 and 25, firmly mount the flanged portions 34 of the bracket to the mounting pedestals 26 and 27 which are carried on the structure S'. The elongated slots 44 enable the use of a given bracket 32 generally irrespective of the spacing of studs 24 and 25.

Referring to FIG. 2, the plane in which the offset portion 36 is located is positioned between stud 5 and the plane of the flanged portions 34. Such position compensates for the normally inadequate length shock absorber where the structures S and S' to be shock insulated from each other are spaced apart by a substantial distance. Referring to FIG. 3, the position of the bracket 32 has been reversed such that the plane of the offset portion 36 lies beneath the plane of the flanged portions 34. Such reversal enables the installation of a shock absorber having the same length as the shock absorber shown in FIG. 2, but in an installation where the structures S and S' are spaced closer together than in the installation shown in FIG. 2.

It will be readily apparent that the mounting assembly incorporating the principles of my invention may be utilized also where both structures S and S' are adapted either for mountings of the stud-type or of the bar-type, thus enabling installation of a given shock absorber in a wide variety of installational constructions. Where both installations are of the bar-type, a second bracket 20 is provided for stud 5.

It should be understood that the embodiment of the present invention which has been described is merely illustrative of one application of the principles of the invention. Numerous modifications may be made by those skilled in the art without departing from the true spirit and scope of the invention.

What is claimed is:

1. A shock absorber mounting assembly including a housing having mounting means at each end, at least one of said mounting means comprising an elongated stud extending axially from its end of the housing for mounting said housing between the structures which are to be shock insulated from each other, wherein the improvement in said assembly comprises in combination:

a rigid bracket having a first portion located in a first plane and a second offset portion located in a second plane spaced from said first plane, said bracket being reversibly associated with said stud such that siad portions may be selectively positioned depending upon the distance between the structure in either one or the other of at least two positions in which one of said portions is between said housing and the other of said portions in said one position and said portions are reversed in said other of the positions, first fastening means for fastening said first portion to one of the structures when said portions are in either of said positions, and second fastening means for fastening said stud to said second offset portion when said portions are in either of said positions.

2. The assembly of claim 1 wherein said second offset portion includes an aperture which receives said stud and said second fastening means fastens said stud in said aperture.

3. The assembly of claim 1 wherein said bracket is substantially U-shaped and said first portion comprises flanges at each side of and extending substantially parallel to said second portion, said second portion forming the bight of said U-shaped bracket.

4. The assembly of claim 1 wherein said second plane is positioned between said first plane and the end of the housing when the distance between the structures which are to be insulated from each other is a given distance and wherein said first plane is positioned between said second plane and the end of the housing when the distance between the structures which are to be insulated from each other is less than said given distance.

5. The assembly of claim 1 wherein said first fastening means includes a pair of fixed studs spaced from each other and carried by said one structure, and a pair of elongated spaced apertures on said first portion of the bracket said elongated apertures receiving each of said fixed studs, irrespective of the spacing of the studs from each other.

6. The assembly of claim 1 wherein each of said mounting means comprises a stud extending from each end of the housing.